United States Patent
Schoop et al.

(10) Patent No.: US 6,434,446 B1
(45) Date of Patent: Aug. 13, 2002

(54) METHOD FOR ADJUSTING THE WORKPIECE FLOW IN A PRODUCTION SYSTEM

(75) Inventors: Ronald Schoop, Hainburg; Siegfried Ralf Neubert, Aschaffenburg; Eckart I. Tietze, Seligeustadt, all of (DE)

(73) Assignee: Schneider Automation GmbH, Seligenstadt (DE)

( * ) Notice: Subject to any disclaimer, the term of this patent is extended or adjusted under 35 U.S.C. 154(b) by 0 days.

(21) Appl. No.: 09/625,410

(22) Filed: Jul. 25, 2000

(30) Foreign Application Priority Data

Jul. 28, 1999 (DE) .......................... 199 35 319

(51) Int. Cl.[7] ................................ G06F 7/00
(52) U.S. Cl. ..................... 700/225; 700/226; 700/228
(58) Field of Search ........................... 700/213, 215, 700/225, 226, 228, 101, 115, 116, 109; 198/341.03, 341.08, 358, 349.6, 349.7, 349.95, 502.3; 29/701

(56) References Cited

U.S. PATENT DOCUMENTS

| | | | |
|---|---|---|---|
| 3,576,540 A | * 4/1971 | Fair et al. ............... | 198/341.03 |
| 3,703,725 A | * 11/1972 | Gomersall et al. .......... | 198/358 |
| 3,743,090 A | * 7/1973 | Brown et al. ............. | 198/349.9 |
| 4,630,216 A | * 12/1986 | Tyler et al. ................ | 198/358 |
| 4,884,674 A | * 12/1989 | Head, III .................... | 198/358 |
| 5,197,172 A | * 3/1993 | Takagi et al. ........... | 364/474.11 |
| 5,374,231 A | * 12/1994 | Obrist .................... | 364/474.21 |
| 5,787,002 A | * 7/1998 | Iwamoto et al. ........ | 364/468.22 |
| 6,061,887 A | * 5/2000 | Kawasaki et al. .......... | 29/407.1 |

FOREIGN PATENT DOCUMENTS

| | | |
|---|---|---|
| DE | 69025970 | 7/1997 |
| DE | 19732046 | 1/1999 |
| EP | 0654721 | 5/1995 |
| EP | 0867793 | 9/1998 |

OTHER PUBLICATIONS

Hans–Dieter Burkhard, "Einfuhrung in die Agenten–Technologie", Informationstechnik und Technische Informatik 40, Apr. 1998, pp. 6–11.

Stefan Bussmann, "Autonome und kooperative Produktionssysteme", Informationstechnik und Technische Informatik 40, Apr. 1998, pp. 34–39.

* cited by examiner

Primary Examiner—Christopher P. Ellis
Assistant Examiner—Khoi H. Tran
(74) Attorney, Agent, or Firm—Dennison, Schultz & Dougherty

(57) ABSTRACT

The invention relates to a method for adjusting the workpiece flow in a production system (10), including workpieces (16) and workpiece agents (18) associated with the workpieces, machines (12) for machining the workpieces (16), and machine agents (14) associated with the machines (12) and transportation device (20). To make a flexible production system available that is tolerant of at least partial failures of system components, it is provided that each transportation agent (30) is assigned at least one machine (12) with a specified machine address Mn; that the transportation agent (30) is tasked to transport the workpiece (16) to a desired destination machine address Mz; and that the transportation agent (30) autonomously controls the transportation device (20) in such a way that the workpiece (16) is transported to the machine with the destination machine address Mz via a specified destination exit (A1–A4).

6 Claims, 5 Drawing Sheets

METHOD FOR ADJUSTING THE WORKPIECE FLOW IN A PRODUCTION SYSTEM

FIELD OF THE INVENTION

The invention relates to a method for adjusting the workpiece flow in a production system, including workpieces and workpiece agents associated with the workpieces, machines for machining the workpieces, and machine agents associated with the machines and transportation means for transporting the workpieces between the machines and transportation agents associated with the transportation means.

BACKGROUND OF THE INVENTION

Known methods for adjusting the workpiece flow in a production system are distinguished by the deposition in memory of the entire structure of the production system in the workpiece agent assigned to the workpiece. First, the workpiece agent of a workpiece reports to a machine agent for a machining variant and tasks a transportation agent to vary the transportation arrangement in such a way that the workpiece is assigned to a specified destination exit, so that the transportation to the desired machine can be carried out.

In this case, the global topography of the production system must be known in all the workpiece agents, since it is the workpiece agent that first informs the transportation agent as to which destination exit of a transportation means is to be established.

Upon a reconfiguration of the production system, especially in the event of local changes such as removing and/or adding machines, all the workpiece agents must be informed of this change, which entails major effort and expense.

SUMMARY OF THE INVENTION

With this as the point of departure, the object of the present invention is to refine a method of the type defined above, in such a way as to furnish as flexible as possible a production system, which is tolerant of at least partial failures of system components and thus has enhanced productivity.

This object is attained according to the invention in that each transportation agent is assigned at least one machine with a specified machine address Mn; the transportation agent is tasked to transport the workpiece to a desired destination machine address; and the transportation agent autonomously controls the transportation means in such a way that the workpiece is transported to the machine with the destination machine address via a specified destination exit.

By this provision of the invention, it is attained that the global topography of the entire production system does not have to be known in all the workpiece agents. Instead, a local assignment of a machine address to a transportation agent is made, and then only this machine address is assigned to that transportation agent. The workpiece agent thus tasks the transportation agent to make a connection with a desired destination machine address. The destination machine address obtained is compared with the local machine address, and as a function of the comparison, the workpiece is either shunted out, transported in the production direction or counter to the production direction, depending on whether the desired destination machine address is greater or less than the local machine address.

The method of the invention is distinguished in particular in that the production system can easily be modified, since local changes such as removing and/or adding machines need to be configured only locally. For instance, if one machine fails, this change need merely be informed to the local transportation agent, to which that machine had been assigned as a local machine address. If this machine address is requested by a workpiece agent, the transportation agent can decide on its own which alternative machine address the workpiece should be transported to.

Advantageously, the machines are disposed in series, and the machine addresses are assigned in increasing order in the production direction. To make later expansions easy, the machine addresses are allocated with gaps in them.

To assure the most flexible, congestion-free transport of the workpieces, these workpieces are transported in different directions over a plurality of transportation paths, and the workpieces are assigned to specified transportation paths as a function of control commands of the transportation agent, in order to reach the desired destination machine address.

The workpiece agent, transportation agent and machine agent are implemented as blocks or software programs in a memory-programmable controller or a personal computer. The performance or mode of operation of the transportation agent, workpiece agent and machine agent, is observed by means of higher-ranking monitoring agents. If one workpiece agent fails, the workpiece can for instance be automatically taken over by a further workpiece agent. The agents also communicate with one another and inform each other of their status at the time.

Further details, advantages and characteristics of the invention will become not only from the claims and the characteristics drawn from them —taken alone and/or in combination —but also from the ensuing description of a preferred exemplary embodiment shown in the drawing.

DETAILED DESCRIPTION OF THE PREFERRED EMBODIMENT

Figure 1:
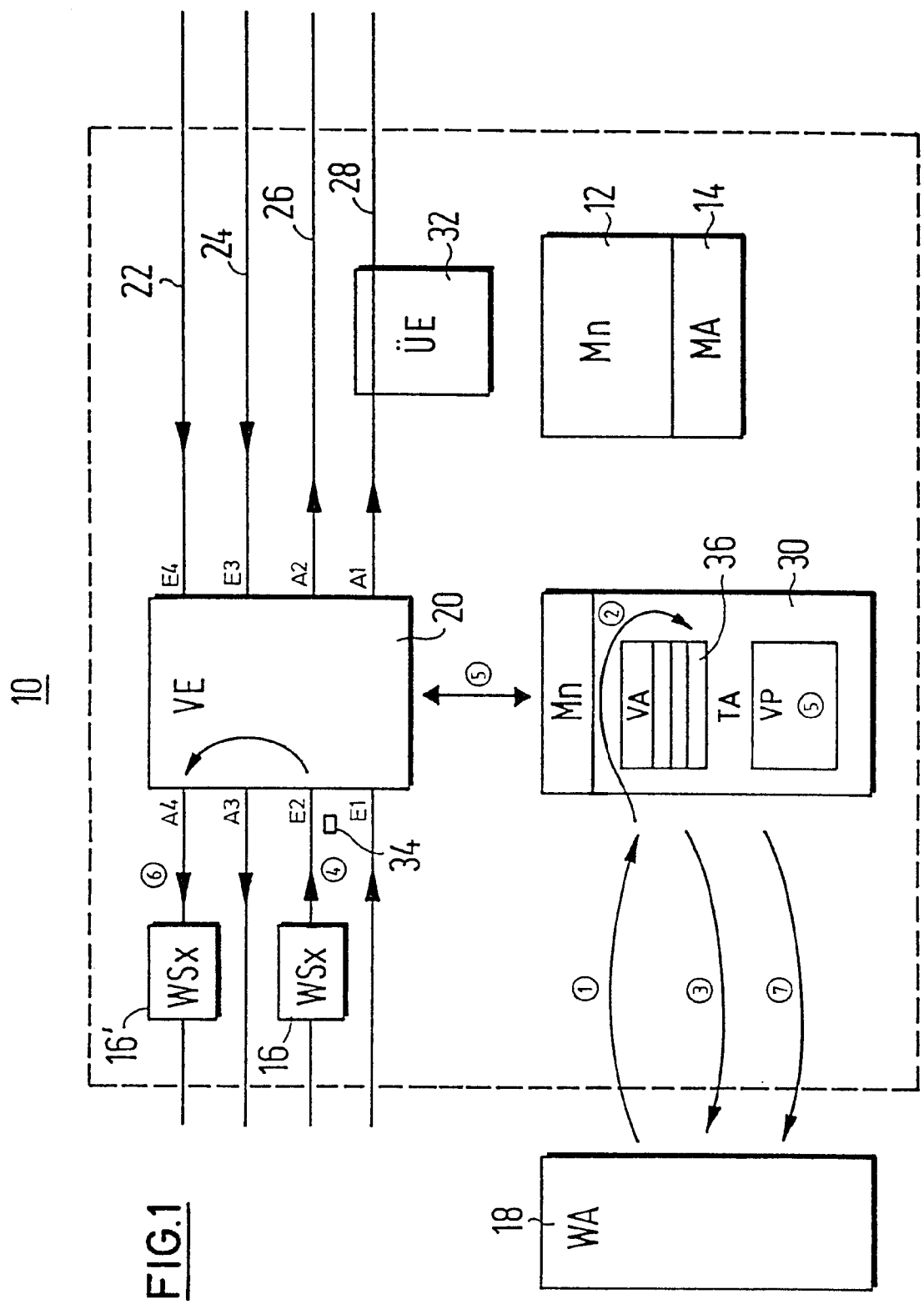
FIG. 1, a detail from a production system shown schematically.

FIG. 1 schematically shows a detail of a production system 10. The production system 10 includes machines 12, machine agents 14 assigned to the machines, workpieces 16, 16', workpiece agents 18 assigned to the workpieces, and transportation means 20, 22, 24, 26, 28 for transporting the workpieces 16, 16' between the machines 12. Transportation agents 30 are assigned to the transportation means.

The transportation means 20 is embodied as a displacement unit, in particular a displacement table, turntable or rotational element, such as a revolving drum, for enabling the workpieces 16, 16' to make the change between the further transportation means 22, 28 embodied as transportation paths. The transportation paths 22–28 are embodied as roller paths, and the transportation paths 26, 28 are disposed on the edge and are driven in the production direction, while the transportation paths 22, 24 are driven opposite the production direction and thus opposite the travel direction of the transportation paths 26, 28. A transfer device 32 is also provided, which connects the machines 12 to the transportation path 28, for instance.

The workpiece 16, 16' is handled during an entire production process by the workpiece agent 18. As soon as the workpiece 16, 16' is shunted into the production system 10, an identification of the workpiece is made via a sensor system, not shown in further detail, and stored in memory in the workpiece agent 18. For a particular type of workpiece, such as a 4- or 6-cylinder engine block, various machining processes are to be performed, which the workpiece agent 18 recognizes from the identification. In the further course of production, the workpiece agent assures that all the required machining processes are made on the workpiece. In particular, the workpiece agent checks the availability of processing machines 12, ascertains which processing machine is most favorable, and brings about transportation to that machine.

As soon as the workpiece 16 is being handled by the workpiece agent 18, the latter communicates with the machine agent 14, assigned to the machines 12, which informs the workpiece agent of the state of machining at the time. Next, from the options offered, the workpiece agent 18 selects the most favorable machine 12, taking into account the fill level at the time of each of the machines involved.

The displacement unit 20 is handled by the transportation agent 30. The transportation agent is capable of independently controlling the displacement unit 20. If the workpiece 16 is being transported over the conveyor belt 26 in the production direction to the displacement unit 20, the workpiece is stopped at an entrance E2 and detected by a sensor 34.

In a first method step V1, the workpiece agent 18 orders the transportation agent 30 to transport the workpiece 16 to a desired destination machine address. In this respect it should be noted that according to the invention, each transportation agent 30 is assigned a certain machine address Mn. All the other machines 12 are assigned either increasing machine addresses M(n+x) or decreasing machine addresses M(n−x). This means that each machine 12 with a certain machine address Mn, together with the associated transportation agent 30 and the displacement unit 20, forms a local unit.

In a second method step V2, the transportation order is stored in memory in a job list 36 and is worked through in the order of the job entries. Next, the transportation agent 30 acknowledges the transportation job and sends an acknowledgement signal back to the workpiece agent 18 (method step V3). In a method step V4, the transportation agent 30 autonomously decides on a certain destination exit to which the workpiece 16, present at the entrance E2, is to be displaced so as to reach the destination machine address Mz over an optimal route. The desired destination machine address Mz is compared with the local machine address Mn of the transportation agent 30, and the desired destination exit is determined as a function of the comparison. If the destination machine address Mz corresponds to the local machine address Mn, then the workpiece 16' is transported to the exit A1 and travels over the conveyor belt 28 to the transfer unit 32 and can be shunted out to the destination machine address Mz=Mn. If the destination machine address Mz is less than the local machine address Mn, that is, if Mz=M(n−x), then the workpiece 16' is transported counter to the production direction, that is, is displaced to one of the exits A3 or A4. If the desired destination machine address Mz should be greater than the local machine address Mn, that is, if Mz=M(n+x), then the workpiece 16' is displaced in the production direction, that is, to the exits A1 or A2. All the machines of the production system 10 is disposed in increasing order of machine address Mn, and the machine address Mn increases in the production direction.

Once the transportation agent 30 has defined a destination exit, a displacement program implemented in the transportation agent is started (method step V5), so that the displacement job can be performed.

The workpiece 16' is shunted to the desired destination exit (A4 in the exemplary embodiment shown) and transported opposite the production direction over the transportation path 22 (method step V6).

The method according to the invention is distinguished in particular in that the production system 10 is easily modified, since such local changes as removing and adding machines have to be configured only locally.

If the machine 12 having the machine address Mn fails, for instance, only the transportation agent 30 has to be reconfigured. The workpiece agents handling the workpieces 16 are unaffected by the reconfiguration, because they know only the associated destination machine addresses Mz of the workpieces they handle. There is accordingly no need for the global topography of the production system 10 to be stored in memory in each workpiece agent. Nor is it necessary for the transportation agent to know all the machine addresses; this is because the transportation agents 30 can also decide for themselves which machine address M(n+x) or M(n−x) is optimal for whatever machining step is desired at the time.

Figure 2:
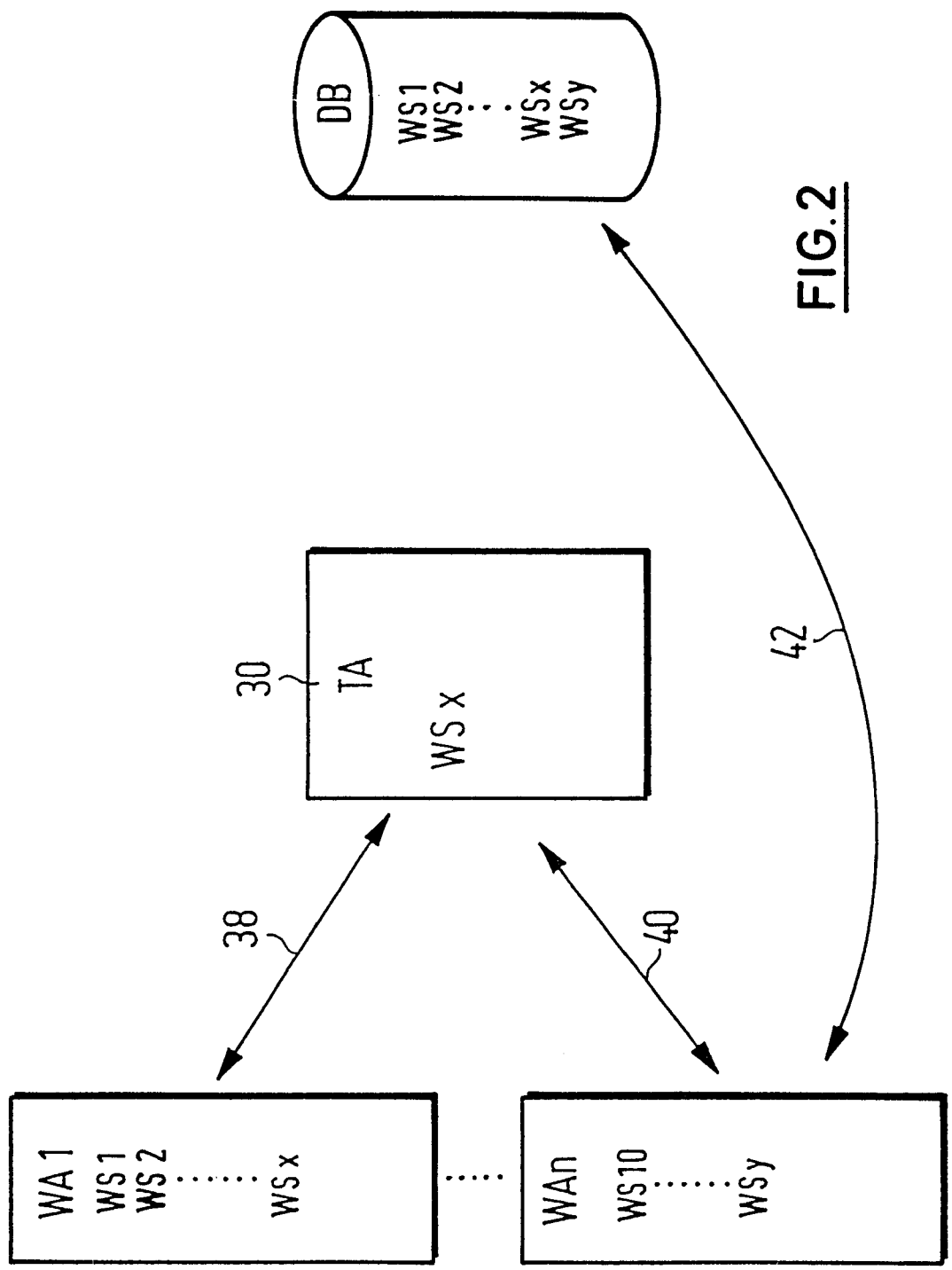
FIG. 2, a schematic method sequence when a workpiece agent fails.

FIG. 2 purely schematically shows a method sequence in the event of failure of a workpiece agent, as an advantageous refinement of the production system 10 of FIG. 1. According to the invention, a plurality of workpiece agents WA 1 . . . WAn are provided, which communicate with the transportation agent or agents 30.

No fixed association is made between the workpiece agents and the workpieces to be monitored; instead, a plurality of workpieces WS 1 . . . WSx or WS 10 . . . WSy are assigned to each of the workpiece agents WA 1 . . . WAn. For instance, the workpiece agent WA 1, over a communication connection 38, gives the transportation agent 30 the order to displace the workpiece WSx. IF data communication is defective, either from a line break or a failure of the workpiece agent WA 1, the workpiece WSx in the method of the prior art would not have any further control or handling function. According to the invention, it is therefore provided that the transportation agent 30 assumes a communication connection 40 with one of the further workpiece agents WA 2 . . . WAn. This take up of contact and selection are preferably done by the randomness principle. The workpiece agent selected checks whether the workpiece-specific data of the workpiece WSx are contained in the memory unit of this workpiece. For instance, if the workpiece agent WAn is selected and ascertains that the workpiece agent WAn contains no workpiece-specific data WSx, then by a further communication connection 42 a connection is made between the workpiece agent WAn and a workpiece database DB in which all the workpiece-specific data are stored in memory.

Finally, the data pertaining to the workpiece WSx are stored in memory in the workpiece agent WAn, so that this workpiece agent is responsible for the remaining machining time of the workpiece WSx. The workpiece agent WA 1 is taken out of service with regard to the workpiece WSx.

This method procedure is distinguished in that failures of workpiece agents WA 1 . . . WAn are reliably intercepted. In particular, the failure of one workpiece agent has no influence on the overall performance of the production system 10.

Figure 3:
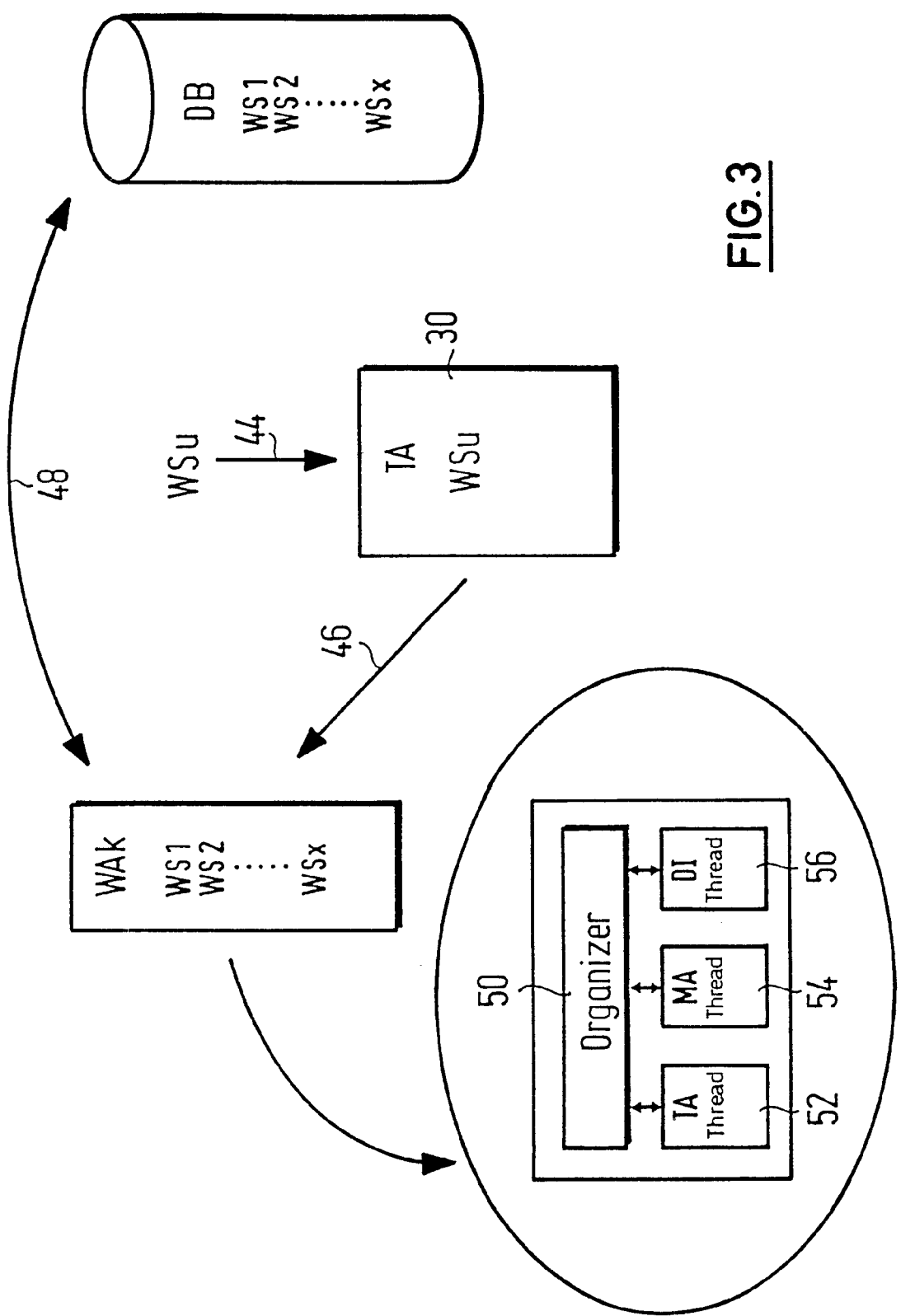
FIG. 3, a schematic method sequence when an unknown workpiece is incorporated.
Figure 4:
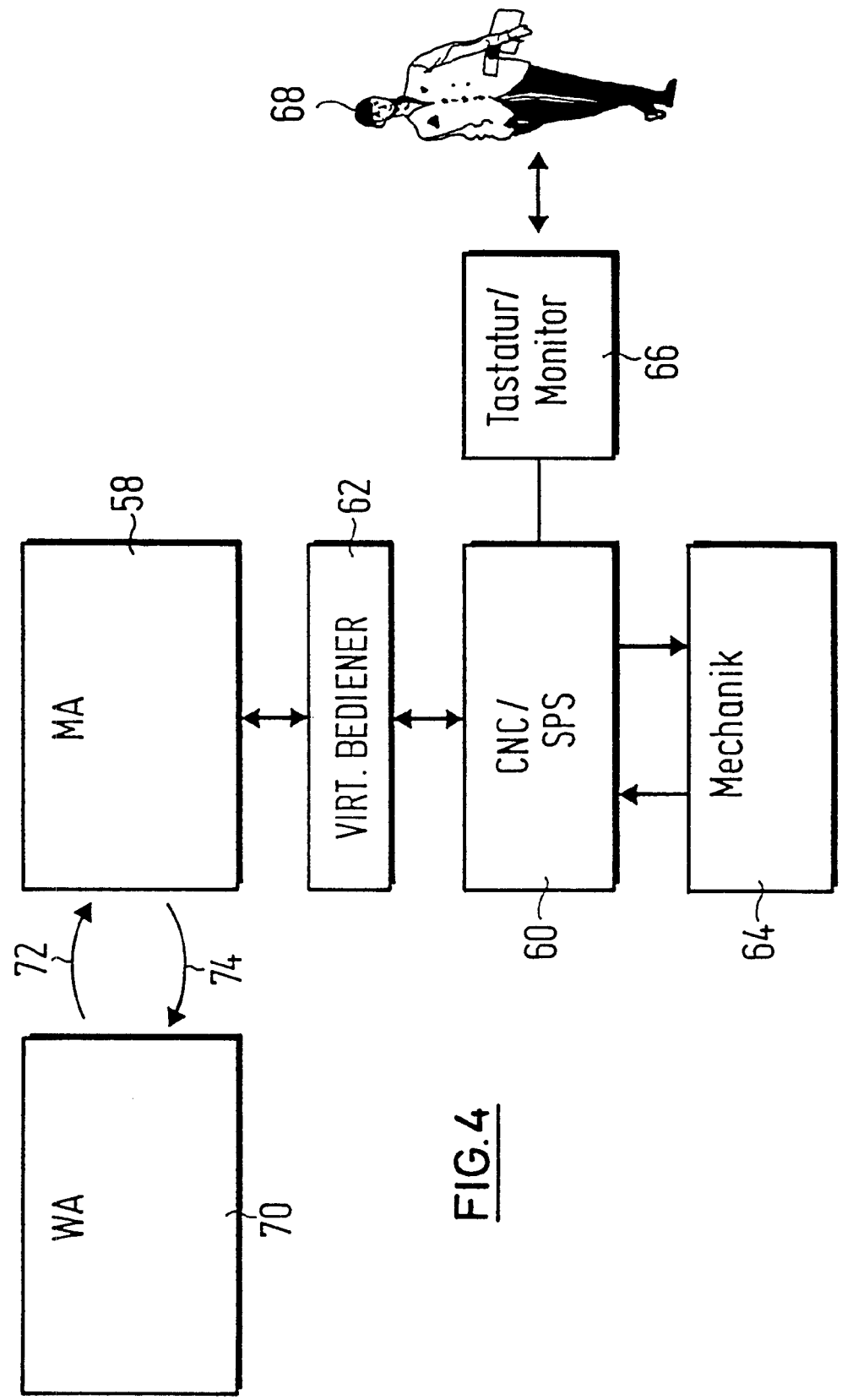
FIG. 4, a schematic illustration of an interface between a machine agent and a memory-programmable controller for a processing machine.

FIG. 3 shows a schematic method sequence upon the incorporation of new workpiece WSu, that is, a workpiece previously unknown to the system 10. First, the unknown workpiece WSu is detected by a sensor system and recorded in the transportation agent 30 via a communication connection 44. The transportation agent 30 ascertains that the workpiece WSu is unknown, whereupon by the randomness principle, via the communication connection 46, one workpiece agent WAk is selected from the existing workpiece agents WA 1 . . . WAn. The workpiece agent WAk, via the connection 48, assumes contact with the database DB and withdraws the data specific to the workpiece WSu, if such data are contained in the database DB. If not, the possibility also exists that the workpiece WSu, or a workpiece carrier carrying the workpiece, already contains the workpiece-specific data. In that case, via the connection 48, the workpiece agent WAk would deposit a data set in the database DB for the workpiece WSu.

This method procedure according to the invention makes it possible to incorporate unknown workpieces, thus increasing the flexibility of the production system 10.

The workpiece agents WA 1 . . . WAn are constructed such that a control unit 50 controls the function of a plurality of what are known as "threads"; each external agent, such as a transportation agent TA, machine agent MA, or the database DB, is assigned one thread 52, 54, 56. Furthermore, the agents WA, TA and MA communicate with one another and initialize themselves mutually. The reconfiguration is simplified as a result.

A further invention of independent inventive character pertains to an interface 62 disposed between a machine agent 58 and a machine controller 60. The machine controller 60 is connected to the mechanics of the machine 64 via an input/output interface. The machine controller 60 also includes an input unit 66, comprising a monitor and a keyboard, by way of which the machine controller 60 can be operated manually by an operator 68.

Originating at a workpiece agent 70, inquiries or jobs are sent to the machine agent 58 via a communication connection 72. Next, the machine agent 58, via a communication connection 74, transmits a list of options back to the workpiece agent 70. The jobs or inquiries received are converted by the interface 62 into commands that are transmitted to the machine controller 60, so that the desired machining steps will be performed on the workpiece. It is provided that the interface 62 is implemented in the form of a virtual simulation of the operator interface 66. By the interface 62, the advantage is attained that the machine agent 58 can cooperate with every machine or every machine controller 60, since the interface 62 reacts in the same way to all the machine agents. Since the interface 62, similarly to the input unit 66, is constructed for a human operator 68, the expense for the interface 62 is low. The interface 62 can be implemented as a software block in a memory-programmable controller or in a personal computer.

The described method procedures according to the invention make for highly flexible automation of production. In particular, prototypes and samples can be produced directly on a final system, since the items to be processed are newly defined for each production. Furthermore, the entire system can be adapted to different items within minimal time. In particular, it is possible both to construct noncentral databases and to automate diagnosis. Startup times can also be reduced drastically. The same is true for changes among operating modes.

As already mentioned, the failure of one machine has only insignificant influence on productivity, since all the other machines can continue to operate unimpeded. During a bidding phase, the workpiece agents WA 1 . . . WAn ask the machine agents MA which items can be machined. Defective machines do not present themselves for machining, and thus their work is taken over by other machines that are ready for operation.

The constant detection of actual production data makes it possible to optimize the range of options and to make better utilization of the processing machines, thus enhancing both the economy and re-usability of setups.

Last but not least, new machines can be added without reconfiguration, and existing machines can be removed.

By the method of the invention, the workpiece throughput in the production system 10 can be increased by 50–80%. Partial failures of machines can also be tolerated because of alternative routes. The production system 10 becomes flexible overall and is distinguished by low setup costs and low vulnerability to congestion.

Figure 5:
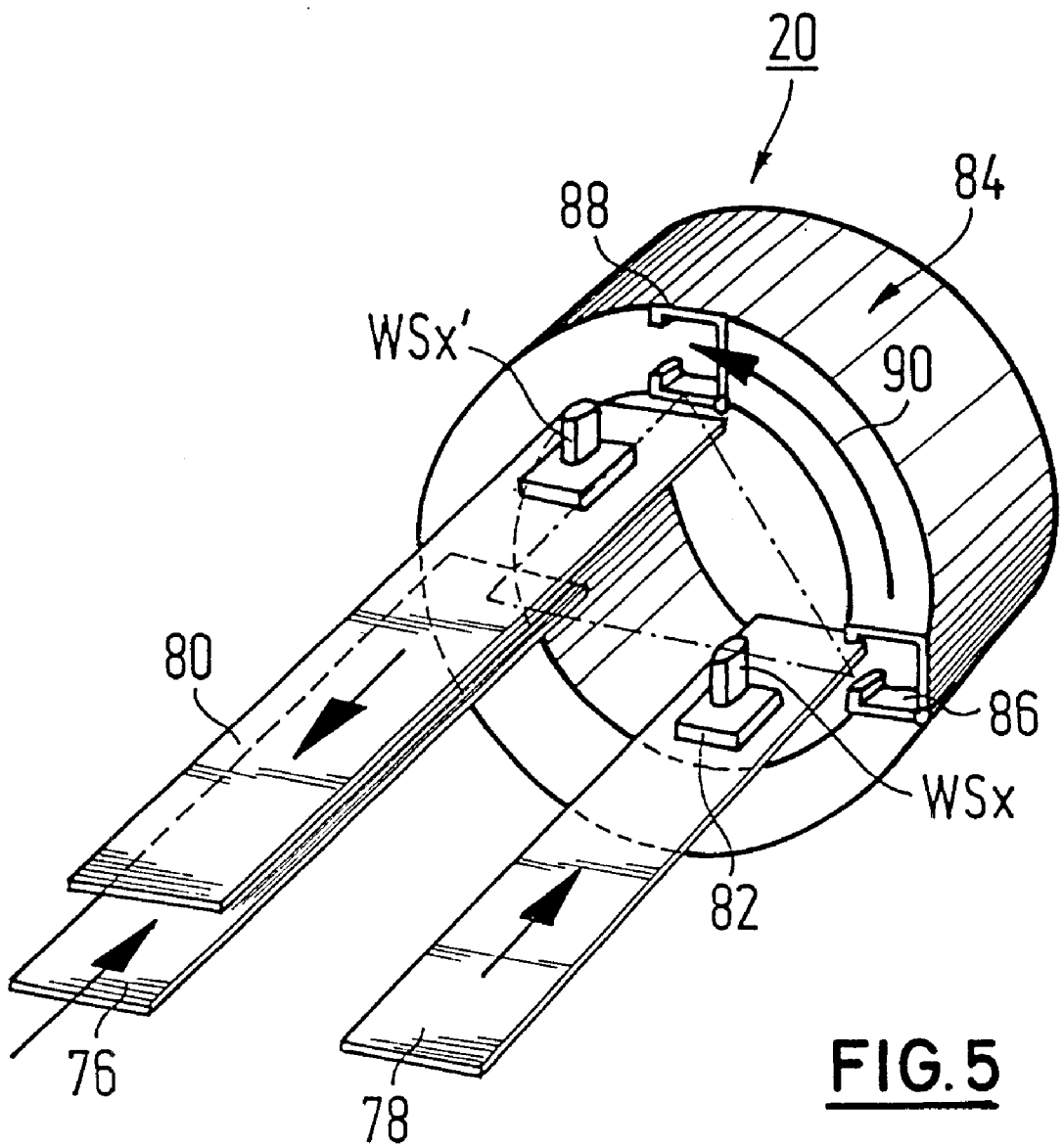
FIG. 5, an apparatus for shifting workpieces among various transportation paths.

FIG. 5 purely schematically shows one possible embodiment of the displacement unit 20. In the exemplary embodiment shown, two conveyor belts 76, 78 are provided, which transport workpieces in the production direction, as well as one conveyor belt 80 that transports workpieces in the opposite direction from the production direction. To achieve a compact structure, the conveyor belts are disposed one above the other in different planes. In the exemplary embodiment, the center axes of the conveyor belts form an equilateral triangle. It is understood that still more conveyor belts can be disposed one above the other, with two conveyor belts running in the production direction in a lower plane and two conveyor belts running in the opposite direction from the production direction in a plane above them. The workpieces WSx are deposited on workpiece carriers 82, which rest on the conveyor belts 76, 78, 80. The displacement unit 20 comprises a mount 84, which encloses the conveyor belts circumferentially and on which receiving devices 86, 88 that can receive or grasp a workpiece WSx, with or without workpiece carriers 82, are disposed on the circumference. By rotation of the preferably drum-like mount 84 in the direction of the arrow 90, the workpiece WSx is rotated by an angle a to the desired conveyor belt and can then be set down on the conveyor belt 80.

Accordingly, the workpiece WSx' can be shifted by a further rotation from the conveyor belt 80 onto the conveyor belt 76. The receiving devices 86, 88 are disposed such that upon rotation of the mount 84, the workpiece maintains its location relative to the horizontal. In particular, the receiving devices 86, 88 can be embodied as gripper devices or roller paths.

What is claimed is:

1. A method for adjusting the workpiece flow in a production system, including a plurality of workpieces and a plurality of workpiece agents associated with the plurality of workpieces, a plurality of machines for machining the plurality of workpieces, a plurality of machine agents associated with the plurality of machines, and at least a first transportation means for transporting the plurality of workpieces between the plurality of machines, comprising the steps of:

transferring a destination machine address (Mz) from one of the plurality of workpiece agents to a transport agent controlling a second transport means;

comparing the destination machine address (Mz) transferred from one of the workpiece agents to the transport agent with a local machine address (Mn) assigned to the transport agent;

transporting one of the plurality of workpieces to the at least a first transportation means by controlling the second transport means by the transport agent, wherein one of the plurality of workpieces is shunted out at the local machine if the destination machine address (Mz) matches the local machine address (Mn) or the workpiece is transported by the at least a first transportation means either in the direction of the plurality of machines with a machine address (Mz=M(n+x)) being larger than the local machine address, or in the direction of the plurality of machines with a machine address (Mz=M(n−x)) being smaller than the local machine address.

2. The method of claim 1, further comprising the step of:

disposing the plurality of machines (12) in series wherein the local machine addresses (Mn) are assigned in increasing order in the production direction.

3. The method of claim 1, further comprising the steps of:

transporting the plurality of workpieces (16) in different directions over a plurality of transportation paths (22, 24, 26, 28), and assigning the plurality of workpieces (16) to one of the transportation paths (22, 24, 26, 28) as a function of control commands of the transportation agent (30), in order to reach the desired destination machine address (Mz).

4. The method of claim 1, further comprising the step of:

controlling the transportation means by the transportation agent (30) autonomously.

5. The method of claim 1, wherein the plurality of workpieces workpiece (18), the transportation agent (30) and the plurality of machine agents (14) are implemented as blocks or software programs in a memory-programmable controller or a personal computer.

6. method of claim 1, wherein if one of the plurality of workpiece agents (18) fails, the plurality of workpieces (16) are automatically taken over by another one of the plurality of workpiece agents.

* * * * *